United States Patent

[11] 3,590,247

| [72] | Inventor | Richard Moore Holford<br>4 Claremount Road, Deep River, Ontario, Canada |
|---|---|---|
| [21] | Appl. No. | 825,751 |
| [22] | Filed | May 19, 1969 |
| [45] | Patented | June 29, 1971 |
| [32] | Priority | Aug. 19, 1968 |
| [33] | | Canada |
| [31] | | 027,816 |

[54] METHOD AND APPARATUS FOR MONITORING A GASEOUS ATMOSPHERE FOR RADIOACTIVE ISOTOPES INCLUDING ORGANIC IODINE COMPOUNDS
8 Claims, 1 Drawing Fig.

[52] U.S. Cl.................................................. 250/83.3,
23/254, 250/43.5, 250/106
[51] Int. Cl...................................................... G01n 23/12

[50] Field of Search............................................. 250/43.5 R,
83 SA, 83.6 FT, 44, 106 SC, 106 T; 23/232, 254

[56] References Cited
UNITED STATES PATENTS

| 2,972,678 | 2/1961 | Anton | 250/43.5 |
| 3,046,396 | 7/1962 | Lovelock | 250/83.6 X |
| 3,176,135 | 3/1965 | Lovelock | 250/43.5 X |

*Primary Examiner*—James W. Lawrence
*Assistant Examiner*—Davis L. Willis
*Attorney*—James R. Hughes ABSTRACT: Air near, for example, a nuclear reactor, is monitored for radioactive isotopes including organic iodine compounds by adding a trace addition of fluorine, chlorine or bromine so that the isotopes will be adsorbed by a charcoal-loaded filter paper. The filter paper is then analyzed for radioactivity.

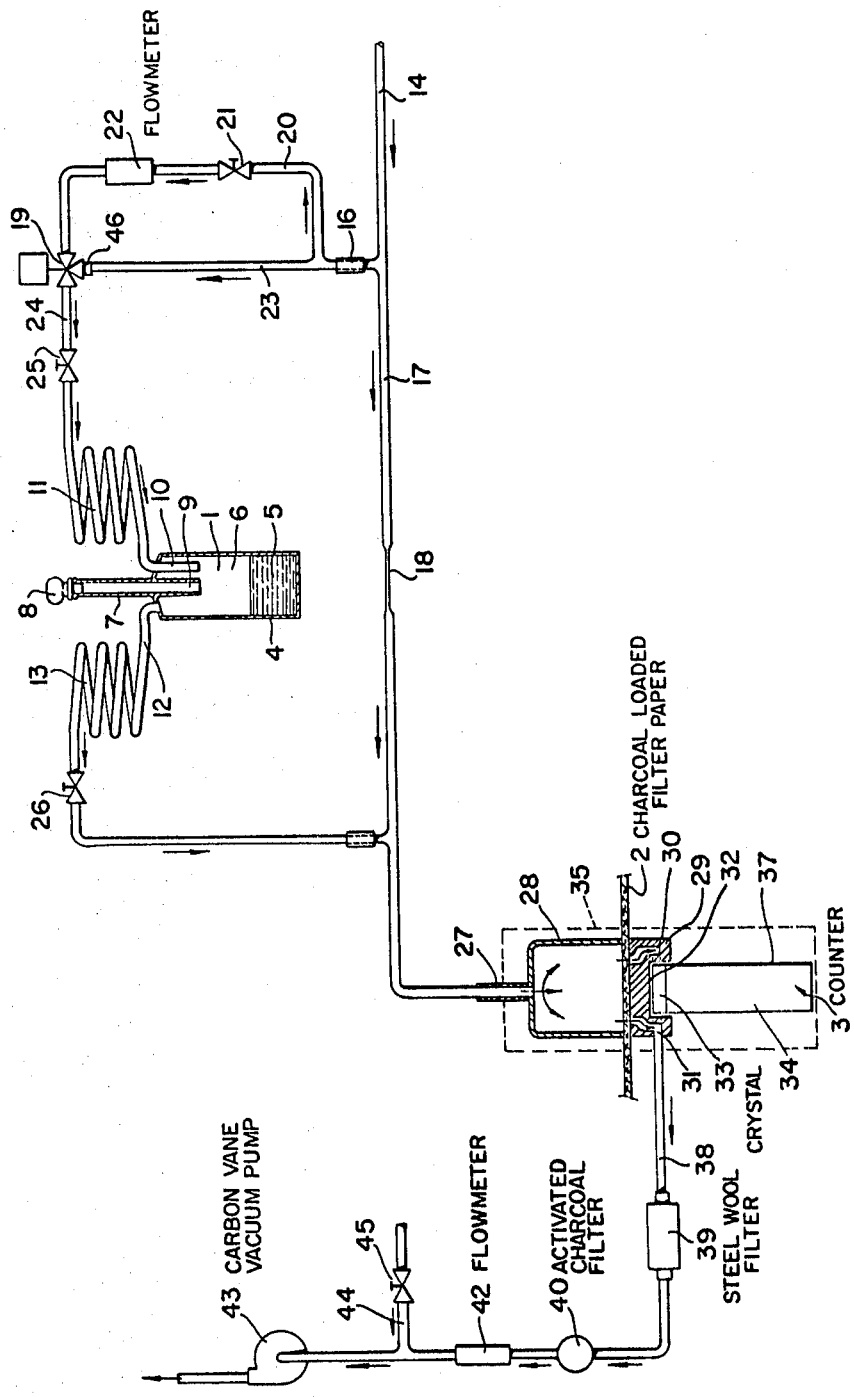

METHOD AND APPARATUS FOR MONITORING A GASEOUS ATMOSPHERE FOR RADIOACTIVE ISOTOPES INCLUDING ORGANIC IODINE COMPOUNDS

This invention relates to a method and apparatus for monitoring a gaseous atmosphere for radioactive isotopes including organic iodine compounds.

One of the main problems encountered in monitoring air near, for example a nuclear reactor, for radioactive isotopes including organic iodine compounds, such as methyl iodine, is that charcoal-loaded fibrous sheet material will not retain organic iodine compounds for any appreciable time. Charcoal-loaded fibrous sheet materials will retain iodine in the elemental form, but because of their inability to retain organic iodine compounds they have been considered unsuitable for many applications in health physics, such as monitoring air near nuclear reactors.

It is an object of the present invention to provide a method and apparatus for monitoring gaseous atmospheres for radioactive iodine isotopes including organic iodine compounds, and wherein the radioactive iodine isotopes are filtered from the gas by means of a charcoal-loaded fibrous sheet material.

According to one aspect of the invention there is provided a method of monitoring a gaseous atmosphere for radioactive iodine isotopes including organic iodine compounds, comprising introducing gaseous halogen into a stream for the atmosphere, the gaseous halogen being of a halogen selected from the group fluorine, chlorine and bromine, to enable the said compounds to be adsorbed from the said gas by means of a filtering medium comprising a charcoal-loaded fibrous sheet material, passing the said stream containing said gaseous halogen through the said sheet material, and analyzing the said filtering medium for radioactivity.

According to a second aspect of the invention there is provided monitoring apparatus, adapted to monitor a gaseous atmosphere for radioactive iodine isotopes including organic iodine compounds, comprising means for introducing gaseous halogen, selected from the group fluorine, chlorine and bromine, into a stream of the atmosphere, a charcoal-loaded fibrous sheet material filtering medium through which the stream containing said gaseous halogen is passed to remove said radioactive iodine isotopes, and means for analyzing the said filtering medium for radioactivity.

Preferably the filtering medium is impregnated with the gaseous halogen before the stream containing the gaseous halogen is passed through the filtering medium, and the gaseous halogen is introduced as a trace addition into the stream.

In the preferred embodiment the gaseous halogen is evaporated bromine, and is introduced into the stream as a trace addition by passing a separated portion of the stream through an evaporated portion of liquid bromine, and then the separated portion of the stream is recombined with the remainder thereof.

Preferably gaseous halogen remaining in the stream, after it has passed through the filtering medium, is filtered therefrom.

In the accompanying drawing, which illustrates by way of example, an embodiment of the invention, there is shown a monitoring apparatus adapted to monitor a gaseous atmosphere, in the form of air around a nuclear reactor, for radioactive iodine isotopes including organic iodine compounds.

In the drawing there is shown a means generally designated 1 for introducing a gaseous halogen in the form of bromine vapor into an airstream of an atmosphere, around a nuclear reactor, containing radioactive iodine isotopes, including organic iodine isotopes, a charcoal-loaded fibrous sheet material filtering medium, in the form of charcoal-loaded filter paper 2, through which the stream is passed to remove the radioactive isotopes, and means 3 for analyzing the filtering medium 2 for radioactivity in the form of a single channel scintillation counter.

The means 1 comprises a glass flask 4 for evaporating liquid bromine 5 therein to provide the bromine vapor, designated 6. The flask 4 has a filling mouth 7 provided with a polytetrafluoroethylene stopper 8 and which extends inwardly at 9 to prevent liquid bromine from entering the tube 12 whilst the flask 4 is filled with liquid bromine along the filling mouth 7. The flask 4 has a glass inlet tube 10 which protrudes into the flask 4 and is coiled at 11 to provide a long path for bromine vapor to diffuse along when no airstream is flowing along the tube 10. The flask 4 has a glass outlet tube 12 which is coiled at 13 for the same purpose as the tube 10.

An airstream flow along the glass tube 14 has a portion separated therefrom to flow along a glass tube 16 whilst the remainder flows along a glass tube 17 containing a venturi 18. The portion of the airstream flow along the glass tube 16 may be directed by a three-way valve 19 to flow along a butyl rubber tube 20 through an adjustable valve 21, and a flow meter 22 to the valve 19, or may be directed to flow along a bypass butyl rubber tube 23 through a millipore filter pack 46. The millipore filter pack 46 comprises a number of millipore filter layers in a stainless steel holder which is sealed by an O-ring. The number of layers of millipore filter used gives an approximate adjustment of the flow of air therethrough. From the valve 19 this portion of the airstream flows along a glass tube 24 through a polytetrafluoroethylene stop cock 25 to the tube 10. After passing through the flask 4 this portion of the airstream passes along the tube 13 through a polytetrafluoroethylene stop cock 26 and is conveyed by a glass tube 27 to the tube 17 downstream of the venturi 18. This flow system provides a means for separating a portion of the airstream from the remainder, a means for passing the separated portion through the evaporated bromine vapor 6, and a means for metering this portion of the airstream, as will be described later.

The tube 17 has its outlet connected by a flexible polytetrafluoroethylene tube 27 to an inlet of a polytetrafluoroethylene stainless steel bell clamp 28. The bell clamp 28 clamps the filtering medium 2 in a substantially gastight manner to a clamp base 29 having an annular air passage 30 therein connected to an outlet 31. A recess 32 in the underside of the clamp base 29 has a thallium activated sodium iodide scintillating crystal 33 therein which together with a photomultiplier 34 forms the means 3 for analyzing the filtering medium 2 for radioactivity. The bell clamp 28, clamp base 30, and the means 3 for analyzing the filtering medium 2 for radioactivity are disposed within a lead shielding 35 (shown dashed). The lead shielding 35 has slots therein through which the filtering medium 2 extends. The photomultiplier 34 is connected to a power supply and electronic counter 37.

The outlet 31 is connected by a butyl rubber tube system 38 containing a filter 39 containing steel wool as the filtering medium, an activated charcoal filter 40 and a flowmeter 42, and the airstream is drawn therethrough by a carbon vane vacuum pump 43. A branch inlet 44 to the tube system 38 from atmosphere contains a flow control valve 45.

In operation, the apparatus arranged as shown in the drawing, was disposed as a stack monitor for monitoring the atmosphere of a room containing remote fuel rod handling equipment of a nuclear reactor. To this end the pipe 14 withdraws air from an exhaust duct for the room and the pump 43 returns the air to the exhaust duct downstream of the pipe 14. The vacuum pump 43 was started up and the valve 45 was adjusted until the flowmeter 42 indicated a flow of 20 liters per minute with the valve 19 set to pass an airstream along the tube 20 with valve 21, adjusted to indicate a flow of 0.2 liters per minute on flowmeter 22 and the valves 25 and 26 open. The airstream passing along the tube 20 entrained evaporated bromine from the flask 4, then combined with the airstream flowing along the tube 17 and both passed to the filtering medium 2. The apparatus was operated in this manner for approximately 10 seconds to initially impregnate the filtering medium 2 with approximately 80 milligrams of evaporated bromine which was entrained in the airstream passing through the flask 4. The valve 19 was then set to pass an airstream along tube 23 and through the millipore filter pack 46, the flow rate along this path being approximately 0.1 milliliters per minute. This gave approximately 10 milligrams per hour of evaporated bromine, entrained in the airstream from the flask 4. The power supply and counter 37 were then used to measure the rate of increase in radioactivity of the filtering medium 2. As no organic iodine compounds appeared to pass through the filtering medium 2 the concentration of radioactive iodine isotopes including organic iodine compounds in the air entering the tube 14 were deduced from the rate of increase in radioactivity indicated by the counter 37. Using the apparatus without any bromine in the flask 4 showed that organic iodine compounds were not filtered by the filtering medium 2.

Any evaporated bromine that passed through the filtering medium was found to be extracted from the airstream by the filters 39 and 40.

All of the components of the apparatus which were brought into contact with the bromine or evaporated bromine were either of glass, polytetrafluoroethylene or a corrosion resistant zirconium alloy such as that comprising by weight 1.5 percent tin, 0.5 percent iron, 0.1 percent chromium, 0.05 percent nickel, balance zirconium except for impurities.

Instead of using flask 4 containing liquid bromine, it may be replaced by a container into which gaseous fluorine, chlorine or bromine is bled from a pressurized source thereof, such as a gas cylinder, so that a metered quantity of the gas is fed into the airstream passing through valve 19. In this embodiment the apparatus would in other respects function in the same manner as the previous embodiment.

It will be appreciated that when the filtering medium 2 has become sufficiently impregnated with iodine to lose its filtering efficiency the filtering medium 2 is replaced by a fresh filtering medium. For this purpose the filtering medium is preferably in the form of a roll which may be replaced in the bell clamp 38 by releasing the bell clamp 28, moving the filtering medium 2 to draw fresh filtering medium from the roll and under the bell clamp 28, and then clamping the bell clamp 28 once more on the clamp base 30.

The apparatus can conveniently be portable, and the detection of the intensity of radioactivity on the filtering medium 2 is improved by providing as much shielding 35 as is practicable. The detection of the intensity of radioactivity on the filtering medium can also be improved by providing a second channel on the scintillation counter which measures the background radiation intensity of the scintillation crystal and a digital subtraction circuit which subtracts this value from that indicated for the filtering medium 2.

In a different embodiment the tube 23 is omitted so that the only path for the airstream is along the tube 20. The valve 19 is replaced by a two-way, normally closed valve. The metering of the bromine vapor is then controlled by giving a relatively fairly long initial open pulse of the two-way valve, as described above with reference to the drawing. This is followed by relatively short open pulses of the two-way valve at suitable intervals, for example for one second at intervals of a thousand seconds. The actual intervals required can be determined by experiment.

What I claim is:

1. A method of monitoring a gaseous atmosphere for radioactive iodine isotopes including organic iodine compounds comprising introducing gaseous halogen into a stream of the atmosphere, the gaseous halogen being of a halogen selected from the group fluorine, chlorine and bromine, to enable the said compounds to be absorbed from the said gas by means of a filtering medium comprising a charcoal-loaded fibrous sheet material, passing the said stream containing said gaseous halogen through the said sheet material, and analyzing the said filtering medium for radioactivity.

2. A method according to claim 1, wherein the said filtering medium is impregnated with said gaseous halogen before said stream containing said gaseous halogen is passed through said filtering medium, and said gaseous halogen is introduced as a metered-trace addition into said stream.

3. A method according to claim 2, wherein said gaseous halogen is evaporated bromine and is introduced into the said stream as a trace addition by passing a separated portion of said stream through an evaporated portion of liquid bromine, and then recombining said separated portion of said stream with the remainder thereof.

4. A method according to claim 1, wherein gaseous halogen remaining in the said stream, after it has passed through the said filtering medium, is filtered therefrom.

5. Monitoring apparatus, adapted to monitor a gaseous atmosphere for radioactive iodine isotopes including organic iodine compounds, comprising means for introducing gaseous halogen, selected from the group fluorine, chlorine and bromine, into a stream of the atmosphere, a charcoal-loaded fibrous sheet material filtering medium through which the stream containing said gaseous halogen is passed to remove said radioactive iodine isotopes, and means for analyzing the said filtering medium for radioactivity.

6. Apparatus according to claim 5, wherein means is provided for initially impregnating said filtering medium with said gaseous halogen, and said means for introducing gaseous halogen into said stream includes metering means for introducing a metered trace addition into said stream.

7. Apparatus according to claim 5, wherein said means for introducing gaseous halogen into said stream comprises means containing evaporated liquid bromine, means for separating a portion of said stream from the remainder thereof, and means for passing said separated portion through said evaporated bromine.

8. Apparatus according to claim 5, wherein a filtering means is provided for filtering gaseous halogen from said stream which has not been filtered therefrom by said filtering medium.